UNITED STATES PATENT OFFICE.

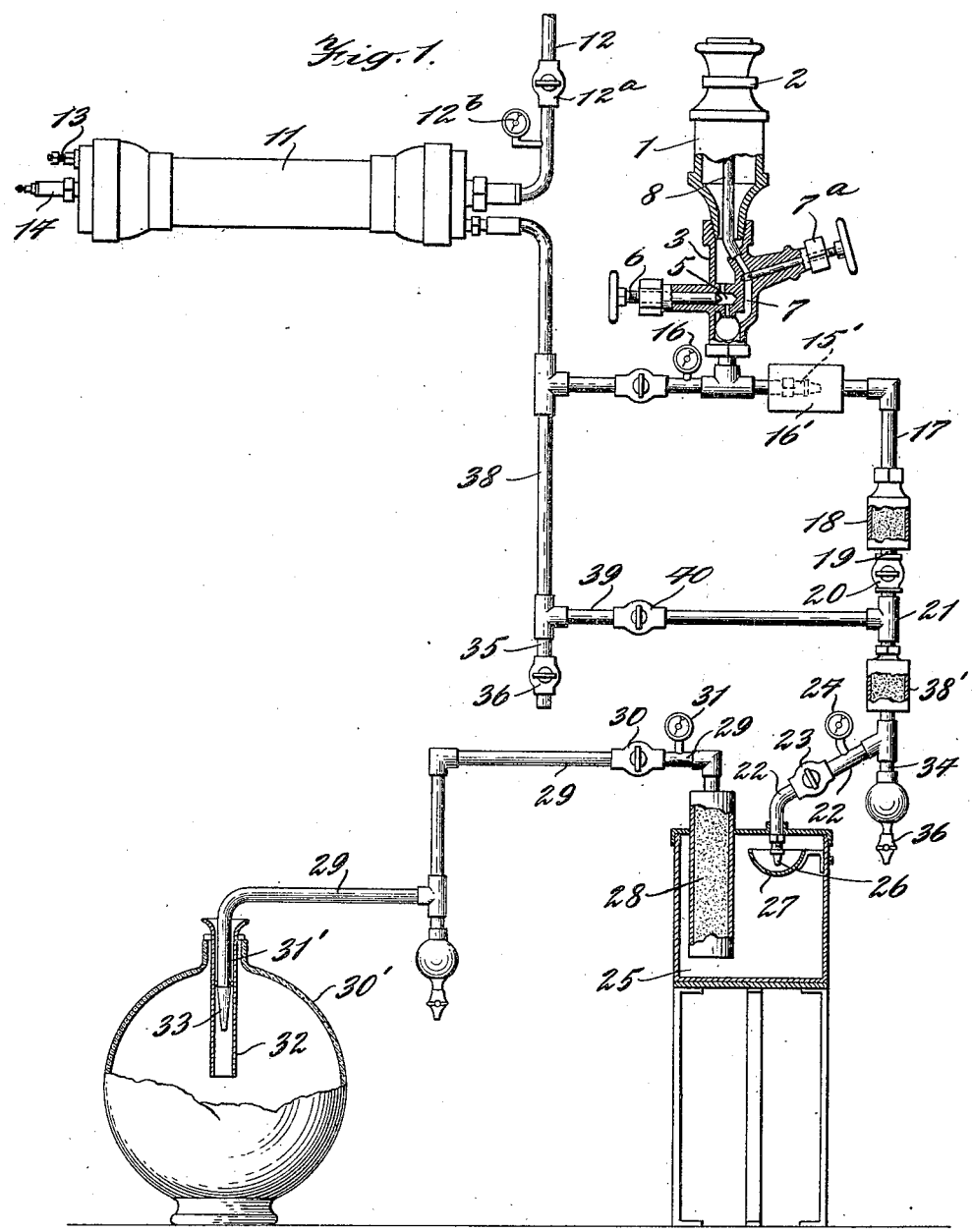

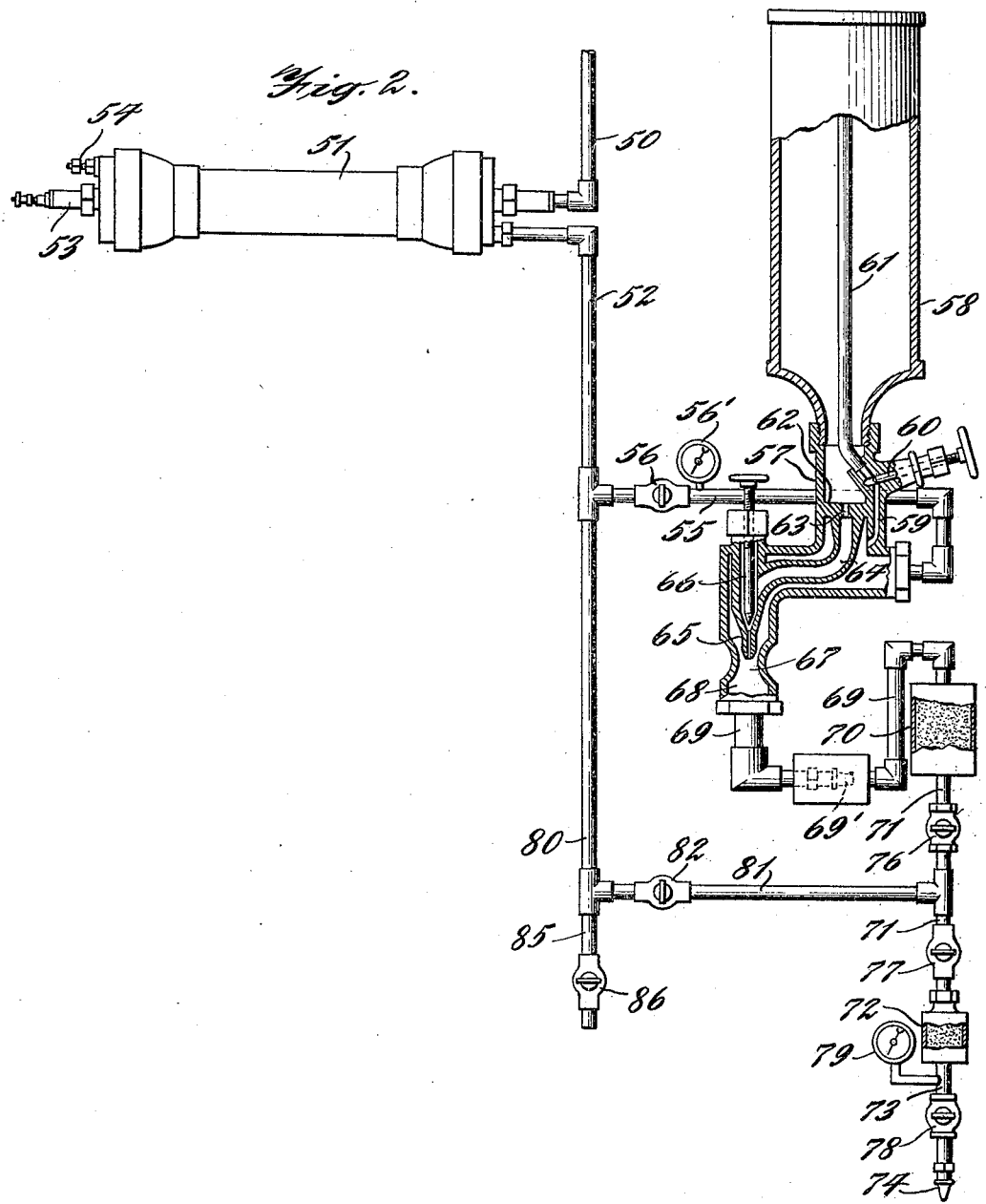

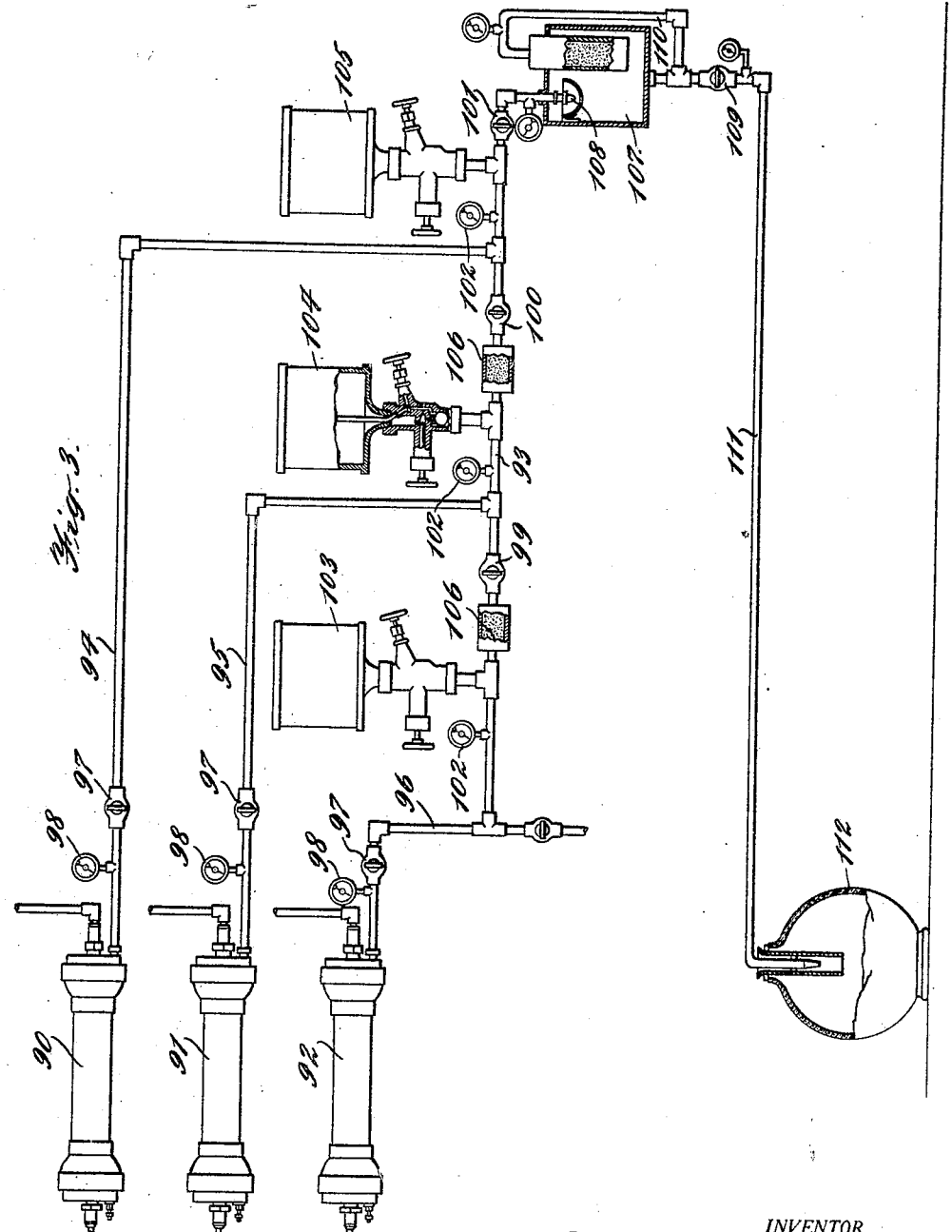

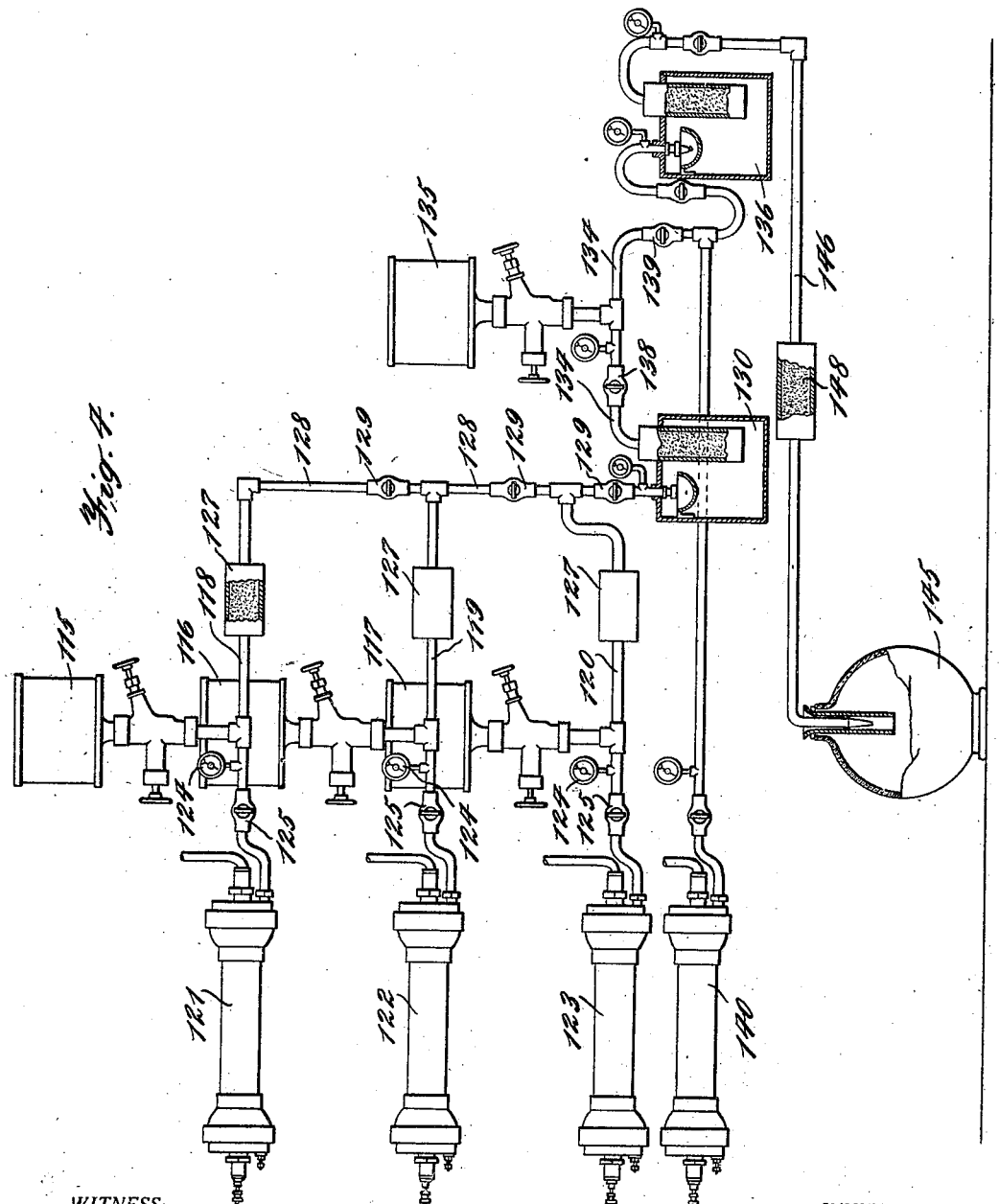

ALFRED J. MOISANT, OF NEW YORK, N. Y.

APPARATUS FOR OZONIZING SUBSTANCES.

1,368,346.

Specification of Letters Patent.  Patented Feb. 15, 1921.

Original application filed August 4, 1916, Serial No. 113,068. Divided and this application filed March 15, 1919. Serial No. 282,810.

*To all whom it may concern:*

Be it known that I, ALFRED J. MOISANT, a citizen of the United States, residing at the city of New York, in the borough of Manhattan and State of New York, have invented certain new and useful Improvements in Apparatus for Ozonizing Substances, of which the following is a full, clear, and exact description.

This invention relates to an apparatus for ozonizing substances, the application being a division of my co-pending application, Serial No. 238,772, filed June 9, 1918, for process of ozonizing substances.

The apparatus forming the invention may be used to ozonize substances which are either in a gaseous or a liquid state, as for example, it may be used to produce pinene ozonid or other substances, which volatilize at ordinary temperatures, or it may be used for ozonizing oils, water, or any other liquids.

The principal feature of the invention is the provision of means whereby the quality and strength of the compound produced may be maintained constant and of any desired strength. This result is obtained by utilizing an apparatus by means of which definite or determinable quantities of the substance to be ozonized are separated from the main body of the substance and are mixed with an ozone-containing body whose strength may be controlled and determined so that the correct proportions of ozone and the substance to be ozonized are present.

My invention therefore contemplates ejecting a quantity of the substance to be ozonized directly into a body containing the ozone. By ejecting an isolated quantity of the substance to be ozonized into the ozone-containing body, without permitting the main body of the substance to come in contact with the ozone-containing body, the danger of a chemical change in the main body of the substance to be ozonized is eliminated, which makes it possible to provide an apparatus which will operate continuously for long periods of time without any change in the quality and strength of the compound produced.

My invention also contemplates an apparatus in which the ozone-containing body is maintained under pressure, since I have found that in this manner the strength and quantity of the ozone-containing body utilized is more readily controlled. Moreover I have also found that where the mixture of the substance to be ozonized and the ozone-containing body in a gaseous state is made when the ozone-containing body is under pressure, and thereafter an expansion is permitted, that during this expansion the molecules of the substance to be ozonized come into more intimate contact with the ozone and a more intimate mixture is obtained.

By utilizing a gaseous ozonizing medium under pressure, a preliminary mixture of the substance to be ozonized with the ozonizing medium may, by a series of reductions in pressure, be further mixed with a second ozonizing medium. The pressure can be easily modified at will by means of valves in the conduits conducting the ozonizing medium.

The invention also contemplates an apparatus in which a plurality of different substances may each be ozonized in the manner described and a mixture or compound containing all of these substances produced.

In the accompanying drawings I have illustrated several embodiments of the apparatus, and it is intended that such embodiments will be construed as illustrative of the invention, rather than limiting, the scope of the invention being clearly defined in the annexed claims.

In the accompanying drawings:

Figure 1 shows somewhat diagrammatically one type of apparatus for producing a compound-containing ozone in a gaseous state;

Fig. 2 is a type of apparatus which may be utilized for producing ozone-containing compounds in a liquid state; and Figs. 3 and 4 show types of apparatus which are utilized when a plurality of different substances are to be ozonized.

Referring first to Fig. 1, the pinene or other substance to be ozonized, is held within a closed cup or reservoir 1, in which it is protected from the atmosphere by means of a cap 2. This cup or container is preferably of glass and is mounted upon a valve casing 3 provided with a valve for controlling the flow of the substance into a conduit 4, upon which the valve casing is mounted. The liquid substance within the cup or container 1 passes downwardly through an opening in its bottom into a duct or conduit 5 in which duct is mounted a needle valve 6 for controlling the amount of the substance which passes therethrough.

In the usual operation of the apparatus the conduit 4 is filled with a fluid under pressure, for which reason, in order to eject or discharge the substance from the container 1 into the conduit, it is necessary to provide a by-pass 7 controlled by a valve 7a which leads from the interior of the conduit 4 to a pipe 8 which extends to a point above the level of the liquid in the cup 1. This balances the pressure upon the liquid and permits it to flow out of the conduit 5 in amounts regulated by the valve 6.

The conduit 4 is connected by a pipe 10 to an ozone tube 11, to which air under pressure is admitted through a pipe 12. The ozone tube or generator may be of any suitable construction, as for example, similar to the tube shown in the co-pending application of William J. Knox and John P. Mallett, Serial No. 815,585, filed January 31, 1914. The binding posts for the ozone tube are designated 13 and 14, and it is to be understood that these posts are connected to any suitable source of electric current whose strength may be regulated at will, so that the strength of the ozone generated within the tube 11 may be controlled.

A valve 12a interposed in the pipe 12 controls the pressure of the air admitted to the ozone tube.

The ozonized air which passes out from the ozone tube through the pipe 10 passes into the conduit 4 and the pressure within the conduit is controlled by a valve 15, the pressure of the ozonized air within the conduit 4 being indicated upon a gage 16. In the conduit 4 the liquid to be ozonized is discharged into the ozonized air and the mixture under pressure passes through a spray nozzle 15′ into a chamber 16′ and then into a pipe 17. In this manner the ozonized air and the substance to be ozonized are broken into small particles and hence brought into intimate contact. The mixture then passes into a mixer 18 which mixer may be of any suitable character, as for example, a chamber filled with a loose mass of material through the interstices of which the mixture of ozonized air and the substance passes, the material used may be beads or similar objects, or gauze diaphragms may be used. The mixture, after passing through the mixer 18, enters a pipe 19 and passes through a valve 20 into a pipe 21, the purpose of the valve being hereinafter referred to. The pipe 21 is connected to a pipe 22 which is also fitted with a valve 23 and a pressure gage 24. The pipe 22 leads into a closed mixing chamber 25 and is provided at the point at which it enters the chamber with a sprayer 26. This sprayer is of a similar construction to the sprayer 15′. If desirable, a deflector 27 may be placed directly beneath the sprayer to distribute the mixture as it enters the mixing chamber throughout the entire interior thereof. It will be noted that this sprayer and deflector are preferably placed as shown in the drawing, adjacent the upper end of the mixing chamber 10, on one side thereof. Arranged on the other side of the mixing chamber and extending to a point adjacent its bottom, is a tube 28, which, similar to the mixer 18, is filled with a loose mass of beads or other suitable material, or with gauze diaphragms, to again effectively mix the ozonized air and the substance to be ozonized. This tube 28 is open at the bottom and is closed at its upper end, the tube leading to a pipe 29 in which is interposed a pressure regulating valve 30 and a pressure gage 31. The pipe 29 extends into a distributing chamber 30′, which consists of a large glass bowl having an open mouth through which the pipe 29 extends. There is also positioned within the open mouth of the distributing chamber 30′ an injector 31′ which consists of a sleeve 32 which surrounds the lower end 33 of the pipe 29, the passage of the mixture through the lower end of the pipe 33 being restricted to increase the velocity and thus cause a current of air to be drawn into the distributing chamber. A sufficient space is left between the sleeve 32 and the mouth of the globe to permit the gases which are formed within the distributing chamber to pass into the atmosphere.

In order to clean the apparatus, drip pipes 34 and 35 are provided, each of which is provided with a stop cock 36 which may be opened when it is desired to clean the apparatus.

In some forms of apparatus it is desirable to provide a second source of ozonized air, and for this reason an extension 38 from the pipe 10 leads to a pipe 39 which connects with the pipe 19. Interposed within the pipe 39 is a pressure regulating valve 40. A mixer 38′, similar in construction to the mixer 18, may also be interposed in the pipe 21.

The operation is as follows:

With the cup or container 1 filled with a liquid such as pinene and all of the valves of the apparatus open, air under pressure is admitted to the pipe 12. Before utilizing any of the substance to be ozonized, the pressures of the ozonized air throughout the entire apparatus is adjusted and an electric current of the proper strength passed through the ozone tube to produce the ozonized air of the requisite strength. To properly proportion the pressure throughout the system the valve 12ª is first adjusted to regulate the pressure at which the air enters the ozone tube, which pressure is indicated upon the gage 12ᵇ. The valves 36 and 40 are then closed and the ozonized air from the pipe 10, which is of the requisite strength passes into the conduit 4. The pressure of this ozonized air is regulated by adjusting the valve 15 until the desired pressure is indicated upon the pressure gage 16. The needle valve 6 is then adjusted to permit the flow of the substance to be ozonized into the conduit 4 in the desired quantities, the by-pass 7 and its valve 7ª being adjusted to properly regulate the pressure above the level of the liquid within the cup 1. The liquid pinene then feeds into the conduit 4, and the mixture of the ozonized air under pressure and the substance to be ozonized passes into the pipe 17 and through the mixer 18, which serves to bring the substance into intimate contact with the ozone and to cause them to unite to form pinene ozonid. While the valve 40 remains closed, as referred to, the valve 20 remains in wide open position and the mixture then passes through the pipe 21 into the mixer 38' and into the pipe 22, the stop cock 36 being of course closed. The valve 23 is then adjusted to regulate the pressure of the mixture as it passes through pipes 17, 19 and 21, and also to determine the pressure at which it enters the mixing chamber 25, the pressure being readable upon the gage 24. The mixture of the ozonized air and pinene, portions of which have united to form pinene ozonid, while other portions still remain in their original state, then pass into the mixing chamber 25 through the sprayer 26. The valve 30 is adjusted to determine the pressure within the mixing chamber, which pressure is readable upon the gage 31, and it might here be stated that this pressure is considerably less than the pressures within the pipes 17, 19, etc., permitting a rapid expansion of the ozonized air and the pinene, as they are ejected through the sprayer 26. This rapid expansion apparently causes a more intimate commingling of the ozonized air and the pinene, which now tends to evaporate and forms a complete union of the two elements into pinene ozonid. The pinene ozonid then passes into the pipe 29 through the mixer 25 and tube 28 in order to insure that any free pinene will be brought into contact with free particles of ozone, and then passes to the distributing chamber where it is diluted with air and passes into the atmosphere.

By regulating the pressures as described, the flow of the ozonized air through the apparatus at the various points is under the absolute control of the supervisor of the apparatus, and since the strength of ozone may be regulated by varying the strength of current passing through the ozone tube, and since the amount of pinene or other substance admitted is also controllable, it is possible to admit to the apparatus only the proper amounts of ozone and the substance which is to unite therewith to form an ozone compound.

If it is found that by using the apparatus in the manner described a perfect association of all the pinene or other substance and ozone can not be obtained, or in other words, if there is any free substance remaining in the distributing chamber 30', which will collect upon the sides, the amount of the substance admitted may be lessened by regulating the valve 6. This result may also be accomplished by opening the valve 40, when a second quantity of ozonized air will enter the pipe 21. When the valve 40 is opened it should be adjusted, as should also the valve 20, to prevent the back flow of the ozonized air through the mixer 18 into the conduit 4.

The apparatus shown in Fig. 2 of the drawing is adapted for use with a process for ozonizing liquids such as water and the like. Generally speaking, the apparatus is similar, the air under pressure being admitted through a pipe 50 to an ozone tube 51, and the ozonized air leaving the ozone tube to a pipe or conduit 52. The binding posts 53, 54 of the ozone tube are adapted to be connected to a source of electric current which may be of any desired strength. The pipe or conduit 52 leads to a pipe or conduit 55, in which is interposed a pressure-regulating valve 56. The pipe 55 is connected to a feeding device for the substance to be ozonized, which comprises a casing 57 upon which is mounted a large cup or container 58 for the liquid. Inasmuch as the ozonized air within the pipe 55 is generally under pressure, a by-pass 59 is provided which is controlled by the valve 60. Communicating with the by-pass 59 is a pipe 61 which leads up through the container 58 to a point above the level to which the container 58 is filled with the substance to be ozonized. The cup 58 is in open communication with the casing 57, which casing has a closed bottom or diaphragm 62, having an aperture or port 63 therein, which leads to a conduit 64, which is continued into a nozzle 65. The flow of liquid through the nozzle 65 is controlled by an adjustable needle valve 66. An extension of the casing 57 surrounds the nozzle 65 and at the discharging opening of the nozzle, this casing is formed to provide a restricted passage 67 for the ozonized air similar to the Venturi tube of a carbureter, whereby the velocity of the ozonized air will be increased and the liquid which fills the nozzle 65 will be sucked from the nozzle 65 into the lower end 68 of the casing 57, which lower end is connected to a pipe or conduit 69. It will be seen that by this construction, the regulation of the needle valve 66 will control the quantity of the liquid substance to be ozonized which is drawn, sucked or discharged into the moving stream of ozonized air. Interposed in the pipe or conduit 69 is a sprayer nozzle 69' and a mixer 70 comprising a chamber inclosing a loose mass of material or gauze diaphragms, both of which elements will effectively mix the ozonized air and the liquid which passes therethrough. A pipe or conduit conducts the mixture consisting of the ozonized air and the liquid, which has been intimately mixed within the chamber 70 to a second mixer 72 of a similar construction, which communicates with a pipe 73 having a spray nozzle 74 at its open end through which the mixture of ozonized air and the liquid compound is discharged into any suitable receptacle, not shown. Interposed within the pipe 71 are pressure-regulating valves 76 and 77 and interposed within the pipe 73 is a similar valve 78, as well as a pressure-gage 79.

A pipe 80 forms an extension of the pipe 52 and has connected thereto a branch 81 in which is positioned a pressure-regulating valve 82. The pipe 81 communicates with the pipe 71 between the valves 76 and 77. In order to clean the apparatus, a drip pipe 85 is preferably provided, which is controlled by a stop cock 86.

The operation of this form of apparatus is in general similar to the operation of the apparatus for producing gaseous compounds containing ozone. However, the present form of apparatus is designed to ozonize liquids, such as oils, water, alcohol, etc. As the liquid is drawn into the chamber 68 through the nozzle 65, the ozone begins to unite with the liquid to form the desired compound, the formation of this compound being aided to a material extent by the effective mixing of the ozone and the compound which is produced by passing the mixture through the sprayer mixing chambers 70 and 72. It is also to be understood that in the operation of the apparatus according to the process, the ozonized air throughout the apparatus is under pressure and the regulating valves described have a similar function to those described in detail in connection with Fig. 1; that is, the reduction of pressures is so regulated as to cause the ozonized air and the mixture of ozonized aid and the liquid to be ozonized, to flow through the apparatus.

The apparatus shown in Fig. 2 may be utilized for ozonizing any liquid, and while one form of feeding device is disclosed for injecting the liquid into the moving stream of ozonized air, yet it is to be understood that other types of feeding devices, as for example, the type shown in connection with Fig. 1, may be utilized, or in fact any suitable feeding mechanism which will discharge the requisite quantity of the liquid to be ozonized into the stream of ozonized air.

In Fig. 3, I have shown a type of apparatus which is adapted to be used when a plurality of different substances are to be ozonized. These substances may be ones which will combine to form a single compound containing ozone, or may be such that a mixture of different compounds containing ozone will be obtained, as for example, different essential oils may be used, each one of which is ozonized, and a mixture of these compounds distributed into the atmosphere. This phase of the invention, however, is not limited to the use of any particular substances, since the different substances which may be used, may be selected in accordance with the requirements for which the ozonized compounds are to be used. In general, the operation of the apparatus is similar to the one previously described in connection with Figs. 1 and 2, with the exception that there are a plurality of ozone tubes 90, 91 and 92 utilized, each one of which is respectively connected to a common pipe 93 by branch pipes 94, 95, and 96. Each of these branch pipes is provided with a pressure-regulating valve 97 and a pressure gage 98. The common pipe 93 is also provided with a plurality of pressure-regulating valves designated 99, 100 and 101, which valves are positioned between the points of connection of the branch conduits with the common conduit. Pressure gages 102 may also be provided to determine the pressure of the ozonized air at different points in the common tube. There is also mounted upon this comon tube, a plurality of feeding devices, 103, 104 and 105, each one of which is similar to the construction of the feeding device disclosed in Fig. 1. Mixers 106 may also be provided in the common conduit 93, which have the same function as those previously described. The common conduit 93 leads to a mixing chamber 107 which is similar in construction to the mixing chamber 25 shown in Fig. 1, the conduit being preferably provided with a sprayer 108 at the point at which it discharges into the mixing chamber. The pressure within the mixing chamber is regulated by a valve 109 in the outlet conduit 110 of the mixing chamber, which outlet conduit leads to a pipe or conduit 111 leading to the distributing chamber 112, which is similar in construction to the distributing chamber shown in Fig. 1.

The operation of this type of apparatus is in general similar to that described in connection with Fig. 1. However, the pressure-regulating valves 99, 100 and 101 should be so regulated that the pressure of the ozonized air as it passes along through the common conduit, is reduced, which will cause it to flow into the mixing chamber at a relatively rapid rate. The pressure-regulating valves 97 upon the branch tubes 94, 95 and 96, are also adjusted so that the pressure within the tube or conduit 95 is less than in the conduit 96, and the pressure in the conduit 94 less than in 95, corresponding to the reduction in pressures obtained by the pressure-regulating valves 99, 100 and 101. The pressure of the mixture in the mixing chamber 107 is controlled by the valve 109 which should be adjusted to permit considerable expansion of the mixture within the chamber to effect the union of the ozone in the ozonized air with the substances to be ozonized. The common mixture from the mixing chamber leads to the distributing chamber through the conduit 111 and is then distributed into the atmosphere, and may be condensed to again liquefy it.

The form of apparatus shown in Fig. 4 is in general similar to that disclosed in Fig. 3 and is intended to be used where a plurality of different substances are to be ozonized and a mixture of the same obtained. Here, as in Fig. 3, there are a plurality of feeding devices 115, 116 and 117, each of which is adapted to contain a different substance. The feeding devices 115, 116 and 117 are respectively mounted upon conduits 118, 119 and 120, which conduits are supplied with ozonized air preferably under pressure, by means of the ozone tubes 121, 122 and 123. Pressure gages 124 and pressure-regulating valve 125 are also provided in each of these conduits for the purposes already clear. There is also interposed in each of the conduits 118, 119 and 120, mixing chambers 127, the function of which has already been described, the conduits 118, 119 and 120 leading to a common conduit 128 in which is interposed pressure-regulating valve 129, and which conduit leads to a mixing chamber 130. This type of apparatus, however, is adapted, where it is desirable, to first mix a plurality of different ozonized substances together and thereafter mix the mixture thus obtained with another substance which is to be ozonized, and for this reason the pipe 134 extending from the mixing chamber, has mounted thereupon a feeding device 135 which contains another substance which is to be ozonized. The pressure in this part of the conduit is controlled by the pressure-regulating valves 138 and 139. Where desirable, an extra ozone tube 140 may be provided which supplies ozonized air to the conduit 134 at a point below the pressure-regulating valve 139, the conduit 134 then leading to a second mixing chamber 136, where the union of the different substances with the ozone in the ozonized air is again obtained. From the mixing chamber the mixture of the different compounds containing ozone is conducted to the distributing chamber 145 through the conduit 146, in which there may be provided a mixer 148. The manner in which this type of apparatus should be adjusted and regulated is clear, and it is evident that from its construction the pressure of the ozonized air in the different parts of the apparatus may be adjusted in accordance with the character of the substances which are to be ozonized, and a number of mixing chambers provided for obtaining an effective union of the ozone and the substances to be ozonized.

It is evident from the different types of apparatus disclosed that compounds in liquid state which contain ozone, may be produced in an entirely simple manner. The regulation of the electric current to the ozone tubes and the regulation of the feeding devices, as well as the regulation of the pressure in the different parts of the system, give the operator absolute control over the product which is produced, and will permit different substances to be ozonized and mixed together in any desired proportions or quantities and of any desired strength.

I claim:

1. In an apparatus for producing compounds containing ozone, an ozone generator, means for supplying air under pressure to the generator, a feeder for the substance to be ozonized, a mixing chamber, conduits connecting the parts, and pressure regulating valves in said conduits.

2. In an apparatus for producing ozone, an ozone generator, means for supplying air under pressure to the generator, a container for the substance to be ozonized having means associated therewith for feeding small quantities of the substance to be ozonized, a mixing chamber, conduits connecting the generator, mixing chamber and feed device, and pressure regulating valves in said conduits.

3. In an apparatus for ozonizing substances, an ozone generator, a conduit connected to said ozone generator, a device for feeding determinable quantities of the substance to be ozonized into said conduit, a mixing chamber communicating with said conduit, and a spraying apparatus in said conduit at the point where it leads to said mixing chamber.

4. In an apparatus for ozonizing substances, an ozone generator, means for supplying air under pressure to the generator, a conduit connected to said ozone generator, a device for supplying the substance to be ozonized to said conduit, and a spraying apparatus associated with said conduit beyond the point where the substance is supplied to the conduit.

5. In an apparatus for producing compounds for containing ozone, an ozone generator, a conduit connected to said ozone generator, a device for feeding determinable quantities of the substance to be ozonized into said conduit, a mixing chamber communicating with said conduit, a sprayer in said conduit at the point where it leads to said mixing chamber, a conduit leading from said mixing chamber, and a mixing device in said conduit.

6. In an apparatus for producing compounds containing ozone, an ozone generator, a mixing chamber, a conduit connecting said ozone generator to said mixing chamber, a device for feeding determinable quantities of the substance to be ozonized to the conduit interposed between the ozone generator and the mixing chamber, and an additional ozone supply conduit leading to said first named conduit at a point between said feeding apparatus and the mixing chamber.

7. In an apparatus for producing compounds containing ozone, an ozone generator, a mixing chamber, a conduit connecting said ozone generator to said mixing chamber, a device for feeding determinable quantities of the substance to be ozonized to the conduit interposed between the ozone tube and the mixing chamber, an additional ozone supply conduit leading to said first named conduit at a point between said feeding apparatus and the mixing chamber, and regulating valves in each of said conduits.

8. In an apparatus for producing compounds containing ozone, an ozone generator, a mixing chamber, a conduit connecting said ozone generator to said mixing chamber, a sprayer device on said conduit at the point where it opens into said mixing chamber, a device for feeding small quantities of the substance to be ozonized to the conduit interposed between the ozone generator and the mixing chamber, and an additional ozone supply conduit leading to said first named fluid conduit at a point between said feeding apparatus and the mixing chamber.

9. In an apparatus for producing compounds containing ozone, an ozone generator, a mixing chamber, a conduit connecting said ozone generator to said mixing chamber, a sprayer device on said conduit at the point where it opens into said mixing chamber, a device for feeding determinable quantities of the substance to be ozonized to the conduit interposed between the ozone generator and the mixing chamber, an additional ozone supply conduit leading to said first named fluid conduit at a point between said feeding apparatus and the mixing chamber, and regulating valves in said conduits.

10. In an apparatus for producing compounds containing ozone, an ozone generator, a mixing chamber, a conduit connecting said ozone generator to said mixing chamber, a sprayer on said conduit at the point where it opens into said mixing chamber, a device for feeding determinable quantities of the substance to be ozonized to the fluid supply conduit interposed between the ozone generator and the mixing chamber, an additional ozone supply conduit leading to said first named fluid conduit at a point between said feeding apparatus and the mixing chamber, a fluid conduit leading from said mixing chamber to a distributing chamber, and regulating valves in said conduits.

11. In an apparatus for producing compounds containing ozone, an ozone generator, a mixing chamber, a conduit connecting said ozone generator to said mixing chamber, a sprayer device in said conduit at the point where it opens into said mixing chamber, a device for feeding quantities of the substance to be ozonized to the fluid supply conduit interposed between the ozone generator and the mixing chamber, an additional ozone supply conduit leading to said first named fluid conduit at a point between said feeding apparatus and the mixing chamber regulating valves in said conduits, a fluid conduit leading from said mixing chamber to a distributing chamber, and a mixing device in said last named conduit.

12. In an apparatus for producing compounds containing ozone, an ozone generator, a mixing chamber, a conduit connecting said ozone generator to said mixing chamber, a device for feeding quantities of the substance to be ozonized to the conduit interposed between the ozone generator and the mixing chamber, and an additional ozone supply conduit leading to the mixing chamber.

13. In an apparatus for producing compounds containing ozone, an ozone generator, a mixing chamber, a conduit connecting said ozone generator to said mixing chamber, a device for feeding quantities of the substance to be ozonized to the conduit interposed between the ozone generator and the mixing chamber, an additional ozone supply conduit leading to the mixing chamber, and regulating valves in said conduits.

14. In an apparatus for producing compounds containing ozone, a plurality of ozone generators, a mixing chamber, a conduit having a plurality of branches connecting said ozone generators with said mixing chamber, and a plurality of devices for feeding determinable quantities of the substance to be ozonized to some at least of said branch conduits.

15. In an apparatus for producing compounds containing ozone, a plurality of ozone generators, a mixing chamber, a conduit having a plurality of branches connecting said ozone generators with said mixing chamber, and a plurality of devices for feeding quantities of the substance to be ozonized to some at least of said branch conduits.

16. In an apparatus for producing compounds containing ozone, a plurality of ozone generators, a mixing chamber, a conduit having a plurality of branches connecting said ozone generators with said mixing chamber, a plurality of devices for feeding quantities of the substance to be ozonized to some at least of said branch conduits, and regulating valves in said conduit and its branches.

In witness whereof I subscribe my signature.

ALFRED J. MOISANT.